Figure 1:
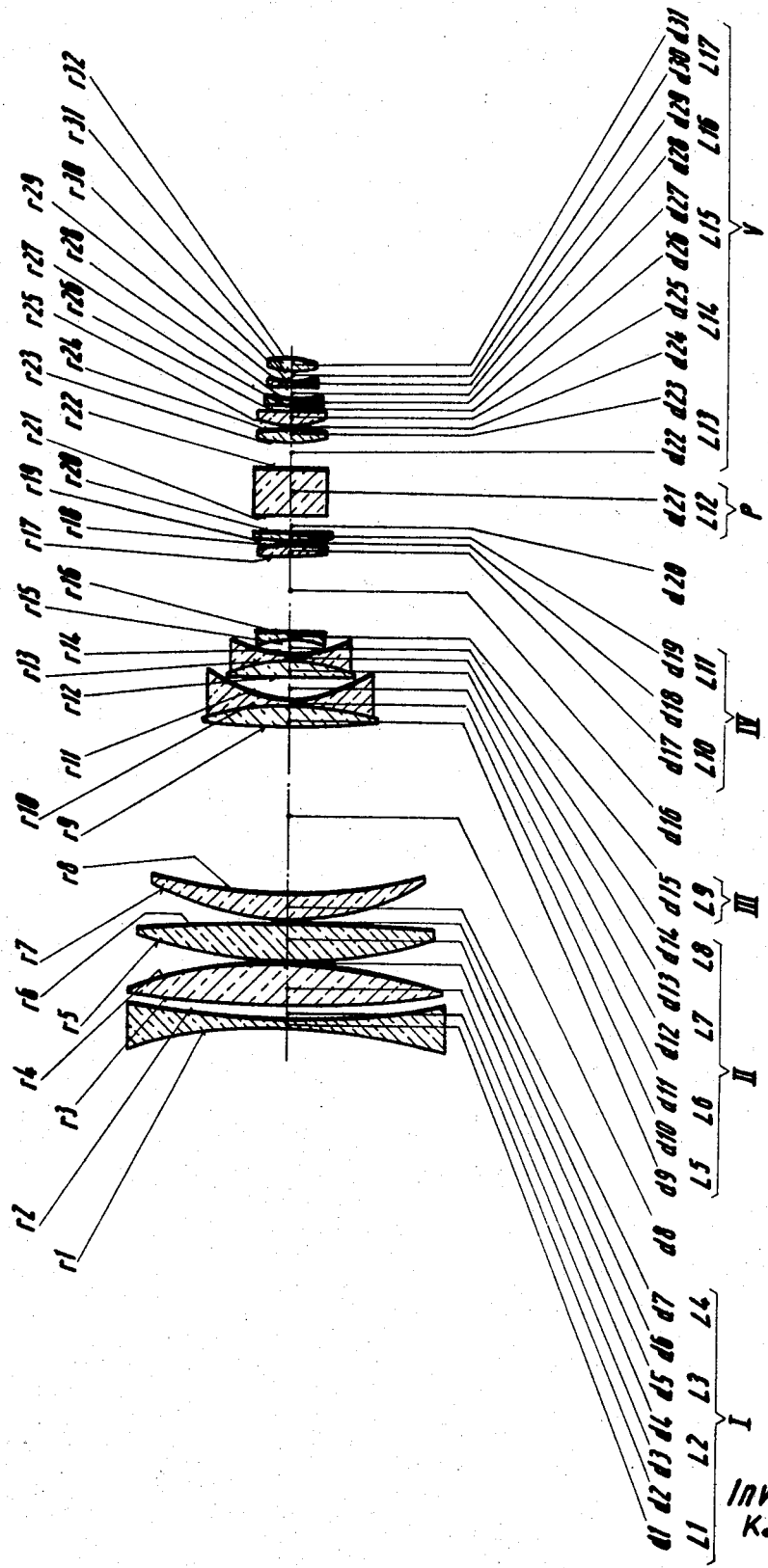

Macher

[15] 3,707,324
[45] Dec. 26, 1972

[54] HIGH-SPEED VARIFOCAL OBJECTIVE SYSTEM WITH FIVE-LENS BASIC OBJECTIVE

[72] Inventor: Karl Macher, bad Kreuznach, Germany

[73] Assignee: Jos. Schneider & Co. Optische Werke Kreuznach, Bad Kreuznach(Rhineland), Germany

[22] Filed: June 30, 1971

[21] Appl. No.: 158,439

[30] Foreign Application Priority Data

July 1, 1970  Germany.....................P 20 32 573.9

[52] U.S. Cl. .................350/184, 350/186, 350/214
[51] Int. Cl. .............................................G02b 15/16
[58] Field of Search...............................350/184, 186

[56] References Cited

UNITED STATES PATENTS 3,350,155  10/1967  Macher..........................350/184 X
3,563,636  2/1971  Macher................................350/184
3,486,809  12/1969  Macher................................350/184

*Primary Examiner*—John K. Corbin
*Attorney*—Karl F. Ross

[57] ABSTRACT

A varifocal objective system with a relative aperture of 1 : 1.8 and a varifocal ratio of about 11 : 1 consists of a five-lens basic objective and a four-component vario attachment. The lenses of the basic objective are all singlets, the third and fourth lenses being dispersive. The attachment is composed of two axially movable negative components bracketed by two substantially fixed positive components; the first component, which may be limitedly shiftable (in whole or in part) for focusing purposes, includes a negative front lens and three positive singlets; the second compartment consists of two negative doublets; the third component is a meniscus-shaped singlet; and the fourth component consists of two air-spaced positive singlets.

2 Claims, 2 Drawing Figures

HIGH-SPEED VARIFOCAL OBJECTIVE SYSTEM WITH FIVE-LENS BASIC OBJECTIVE

My present invention relates to an improvement in varifocal optical objective systems of the general type disclosed in my prior U.S. Pat. Nos. 3,486,809, 3,549,235 and 3,563,636.

The objective system described and illustrated in each of these prior patents is divided into a varifocal front lens group or attachment and a rear lens group constituting a basic or fixed-focus objective, the front attachment having two axially movable negative components bracketed by two substantially fixed positive components. The term "substantially fixed" allows for the possibility that one of these positive components, especially the one in front, be limitedly adjustable for focusing purposes, either in its entirety or in some of its parts. Individual focal lengths $f_I$, $f_{II}$, $f_{III}$, $f_{IV}$ of the several components of this attachment are so chosen that $f_{IV}$ is equal to or less than 75 percent of $f_I$ whereas the absolute value of $f_{III}$ exceeds by at least 10 percent the absolute value of $f_{II}$.

The systems of U.S. Pat. Nos. 3,486,809 and 3,549,235 have a relative aperture of 2:1 and a varifocal range (i.e., ratio of its maximum and minimum overall focal lengths $f_{max}$ and $f_{min}$) of about 10:1. The system of U.S. Pat. No. 3,563,636 has a relative aperture of 1:1.8 and a varifocal ratio greater than 13:1, yet this improvement is realized at the cost of a more complex design of the first component which in that instant (as well as in U.S. Pat. No. 3,549,235) consists of six rather than four lens members, one of them a doublet, in lieu of the four singlets constituting the corresponding component of U.S. Pat. No. 3,486,809.

The general object of the present invention is to provide an improved system which retains the four-member construction of the first component, according to U.S. Pat. No. 3,486,809, while providing a relative aperture of about 1:1.8 and a varifocal ratio greater than 10:1, with compact dimensioning and with reduction of residual aberrations to a minimum in all operating positions.

I have found, in accordance with the present invention, that an improved objective system of this character can be realized by a change in the relative magnitudes of the individual focal lengths $f_I - f_{IV}$ of the components of the forward lens group or attachment and the individual focal length $f_V$ of the rear lens group or basic objective. More particularly, these five individual focal lengths should have substantially the following relative numerical values:

$$f_I = +65$$

$$f_{II} = -19$$

$$f_{III} = -39$$

$$f_{IV} = +41$$

$$f_V = +24.$$

Whereas the axially movable second component of a system according to each of my three prior patents consists of a forwardly convex negative meniscus followed by a dispersive triplet, a particularly advantageous embodiment of my present invention utilizes for this component a pair of forwardly convex meniscus-shaped doublets each having a forwardly concave, preferably collective cemented surface. This affords a favorable correction of chromatic aberration particularly if the lenses of these two doublets have refractive indices greater than 1.65 and if the Abbe numbers of their negative constituents substantially exceed, preferably by at least 20 units, those of the associated positive constituents cemented thereto. The axially movable third component can then be a dispersive singlet, similar to that of U.S. Pat. No. 3,563,636, whereas the axially fixed fourth component consists of two air-spaced singlets as in each of my three prior patents.

Another important feature of my invention, further improving the chromatic performance of the objective system, resides in the construction of the basic objective as a group of five air-spaced singlets, the third and the fourth of them negatively refracting, in contrast to the four-member rear lens group of my prior patents wherein the second member is a negative doublet while the other three members are positive singlets.

The invention will be described in greater detail with reference to the accompanying drawing in which:

FIG. 1 diagrammatically illustrates an embodiment of my invention; and

Figure 2:
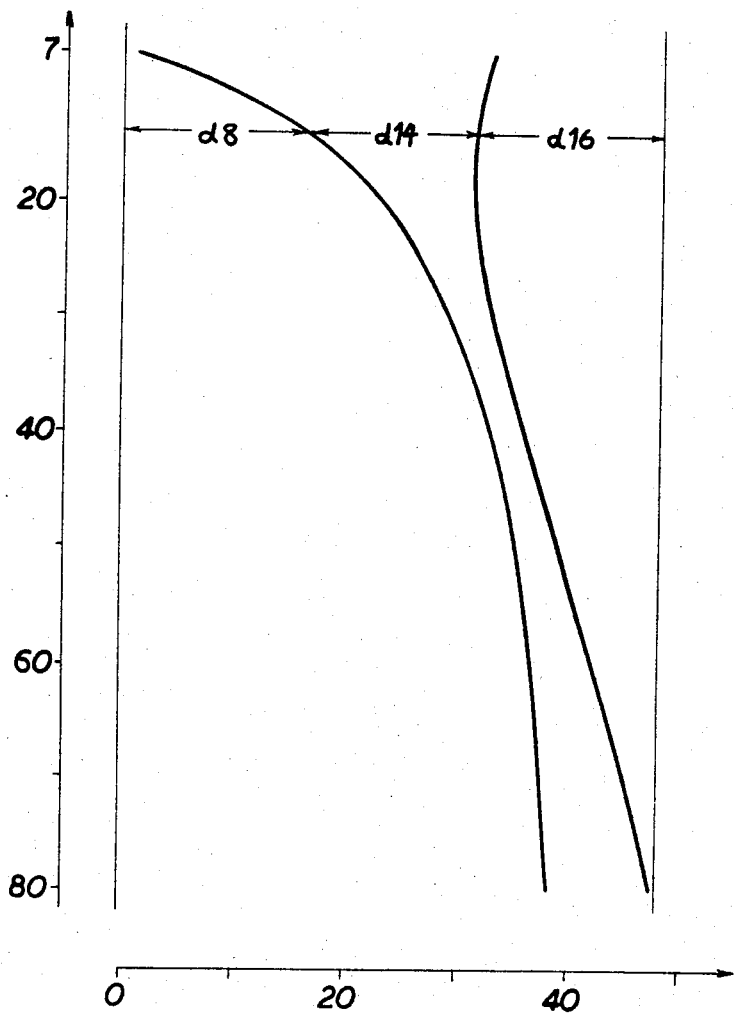

FIG. 2 is a graph showing the relative positions of the two movable components of the adjustable front group of the system of FIG. 1 throughout its varifocal range.

The objective system shown in FIG. 1 comprises four components I, II, III and IV, together constituting a varifocal front group, and a five-member rear group V representing a basic or principal objective from which the varifocal group may be detached if desired. Component I, which may be limitedly axially displaceable for focusing purposes but will otherwise be considered as fixed, consists of a dispersive front lens L1 with radii r1, r2 and thickness d1, a first positive singlet L2 (radii r3, r4 and thickness d3) separated from lens L1 by an air space d2 which is less than one-fourth of the individual focal length $f_I$ of component I, a second positive singlet L3 (radii r5, r6 and thickness d5) separated from singlet L2 by an air space d4, and a third positive singlet L4 (radii r7, r8 and thickness d7) separated from singlet L3 by an air space d6. A variable air space d8 separates component I from the axially movable negative component II which consists of a forwardly convex meniscus-shaped negative doublet composed of a biconvex lens L5 (radii r9, r10 and thickness d9) cemented onto a biconcave lens L6 (radii r10, r11 and thickness d10) and, spaced from it by a distance d11, a similar doublet composed of a nearly biconvex lens L7 (radii r12, r13 and thickness d12) cemented onto a biconcave lens L8 (radii r13, r14 and thickness d13). Another variable air space d14 intervenes between component II and the second axially movable negative component III which is in the form of a forwardly concave meniscus-shaped singlet L9 (radii r15, r16 and thickness d15). A third variable air space d16 exists between component III and the axially fixed positive component IV which consists of two biconvex lenses L10 (radii r17, r18 and thickness d17) and L11 (radii r19, r20 and thickness d19) which are spaced apart a short distance d18. Following a further air space d20 + d21 + d22, shown occupied by a prism P of thickness d21, there is disposed the first lens L13 of group V in the form of a biconvex singlet with radii r23, r24 and thickness $d23$. Next, separated from lens L13 by an air space $d24$, there is a second lens L14 in the shape of a positive meniscus of radii $r25$, $r26$ and thickness $d25$. The third lens L15 of this group, divided from lens L14 by an air space $d26$, is a biconcave singlet of radii $r27$, $r28$ and thickness $d27$; it is separated by an air space $d28$ from the fourth lens L16 which is a negative meniscus with radii $r29$, $r30$ and thickness $d29$. A final air space $d30$ intervenes between lens L16 and the fifth lens L17 of the basic objective, i.e., a biconvex singlet with radii $r31$, $r32$ and thickness $d31$.

The following numerical relationships are desirable from the viewpoint of suppression of field curvature, moderate lens diameters (especially at the front lens) and relatively large surface radii generally simplifying the manufacture of the lenses:

a. Front Attachment $$f_I < -r1 < 2.5 f_I$$
$$2 f_I < r2 < 3 f_I$$
$$2.5 f_I < r3 < 4 f_I$$
$$f_I < -r4 < 2 f_I$$
$$f_I < r5 < 2 f_I$$
$$5 f_I < -r6 < 10 f_I$$
$$0.5 f_I < r7 < f_I$$
$$f_I < r8 < 2 f_I$$
$$7 |f_{II}| < r9 < 12 |f_{II}|$$
$$2.5 |f_{II}| < -r10 < 5 |f_{II}|$$
$$|f_{II}| < r11 < 2 |f_{II}|$$
$$10 |f_{II}| < -r12 < 20 |f_{II}|$$
$$|f_{II}| < -r13 < 2.5 |f_{II}|$$
$$|f_{II}| < r14 < 2 |f_{II}|$$
$$0.3 |f_{III}| < -r15 < |f_{III}|$$
$$3 |f_{III}| < -r16 < 10 |f_{III}|$$
$$2 f_{IV} < r17 < 4 f_{IV}$$
$$f_{IV} < -r18 < 2 f_{IV}$$
$$0.8 f_{IV} < r19 < 1.5 f_{IV}$$
$$10 f_{IV} < +r20$$

(b) Basic Objective $$0.8 f_V < r23 < 1.5 f_V$$
$$5 f_V < -r24 < 8 f_V$$
$$0.4 f_V < 4r25 < 0.8 f_V$$
$$1.2 f_V < r26 < 2.5 f_V$$
$$2 f_V < -r27 < 4 f_V$$
$$0.6 f_V < r28 < 1.2 f_V$$
$$0.3 f_V < r30 < 0.6 f_V$$
$$0.6 f_V < r31 < 1.2 f_V$$
$$0.4 f_V < -r32 < 0.8 f_V$$

In the following Table A I have listed representative numerical values for the radii $r1 - r32$ and the thicknesses and separations $d1 - d31$ of lenses L1 – L17 (the prism P being listed in that Table as a lens L12 of infinite radii $r21$, $r22$), based on the same linear units (e.g., millimeters) as the numerical values of the individual focal lengths $f_I - f_V$ given above together with their refractive indices $n_e$ and Abbe numbers $\nu_e$, based upon the E line of the spectrum, for a system having a relative aperture of 1:1.8, a minimum overall focal length $f_{min}$ of 7.1 units, a maximum overall focal length $f_{max}$ of 80 units and a back-focal length of 13.3 units. The variable air spaces $d8$, $d14$ and $d16$ are given for an intermediate focal length of 32 units.

TABLE A

| Lenses | | Radii | Thicknesses and Separations | $n_e$ | $\nu_e$ |
|---|---|---|---|---|---|
| I | L1 | r1=−120.20 | d1 =2.00 | 1.79180 | 25.87 |
| | | r2 =−165.85 | d2 =2.30 | air space | |
| | L2 | r3=+214.30 | d3=8.10 | 1.62286 | 60.08 |
| | | r4=−92.94 | d4 =0.01 | air space | |
| | L3 | r5=+90.24 | d5=6.80 | 1.62286 | 60.08 |
| | | r6=−445.50 | d6=0.01 | air space | |
| | L4 | r7=+49.96 | d7 =5.40 | 1.68083 | 54.93 |
| | | r8=+100.30 | d8=30.23 | air space (variable) | |
| II | L5 | r9 =+160.50 | d9=4.10 | 1.76167 | 27.37 |
| | | r10 =−64.83 | d10 =1.00 | 1.68083 | 54.93 |
| | L6 | r11=+23.60 | d11 =4.10 | air space | |
| | L7 | r12=−279.40 | d12 =3.10 | 1.76167 | 27.37 |
| | | r13=−34.09 | d13=1.00 | 1.68083 | 54.93 |
| | L8 | r14=+24.78 | d14=3.10 | air space (variable) | |
| III | L9 | r15=−17.16 | d15=1.00 | 1.48914 | 70.22 |
| | | r16=−174.55 | d16=14.37 | air space (variable) | |
| IV | L10 | r17 =+120.20 | d17 =1.80 | 1.52583 | 51.22 |
| | | r18=−54.39 | d18=0.01 | air space | |
| | L11 | r19=+48.91 | d19 =1.80 | 1.52583 | 51.22 |
| | | r20 = ∞ | d20=2.80 | air space | |
| P | L12 | r21=∞ | d21=9.00 | 1.51872 | 63.96 |
| | | r22=∞ | d22=4.50 | air space | |
| V | L13 | r23=+21.05 | d23=2.85 | 1.64129 | 55.15 |
| | | r24=−131.80 | d24=0.01 | air space | |
| | L14 | r25=+13.36 | d25=2.40 | 1.69401 | 54.48 |
| | | r26=+47.26 | d26=1.40 | air space | |
| | L15 | r27=−77.08 | d27=1.00 | 1.81265 | 25.24 |
| | | r28=+21.39 | d28=2.30 | air space | |
| | L16 | r29=+78.39 | d29=1.00 | 1.81265 | 25.24 |
| | | r30=+10.22 | d30=2.00 | air space | |
| | L17 | r31=+21.12 | d31=2.45 | 1.67341 | 46.82 |
| | | r32=−15.20 | | | |

The exact numerical values of the individual focal length of components I - V in the foregoing system are as follows:

$$f_I = +65.1$$
$$f_{II} = -18.5$$
$$f_{III} = -39.0$$
$$f_{IV} = +40.5$$
$$f_V = +24.0$$

FIG. 2 illustrates the law of motion for the two negative components II and III, as represented by the variation of the three air spaces $d8$, $d14$ and $d16$ always adding up to 47.7 units. Table B, below, gives the numerical values of these variable air spaces for five distinct positions of components II and III, with $f$ representing the overall focal length.

Table B

| $f$ | $d8$ | $d14$ | $d16$ |
|---|---|---|---|
| 7.1 | 0.03 | 32.97 | 14.70 |
| 14.0 | 16.48 | 14.57 | 16.65 |
| 32.0 | 30.23 | 3.10 | 14.37 |
| 54.0 | 35.90 | 4.09 | 7.71 |
| 80.0 | 38.53 | 9.09 | 0.08 |

It will be noted that all the five lenses of the basic objective V have a relatively high index of refractivity, not less than 1.64, as compared with the indices of the last two components III, IV of the front attachment and the intervening prism P.

In view of allowable tolerances, the decimals given in the first, second and fourth columns of Table A may be disregarded except in the case of the smaller air spaces and lens thicknesses. In the third column, only the first two decimals of the refractive indices are considered significant.

More particularly, the intracomponent spacings could deviate from the list of values within the following limits:

$$d2 \text{ by } -0.03 f_I \text{ to } +0.1 f_I$$
$$d4 \text{ by } +0.05 f_I$$
$$d6 \text{ by } +0.05 f_I$$
$$d11 \text{ by } -0.1 f_{II} \text{ to } +0.2 f_{II}$$
$$d18 \text{ by } +0.1 f_{IV}$$
$$d24 \text{ by } +0.05 f_V$$
$$d26 \text{ by } -0.03 f_V \text{ to } +0.05 f_V$$
$$d28 \text{ by } \pm 0.05 f_V$$
$$d30 \text{ by } \pm 0.05 f_V$$

The lens thicknesses of each component I–V deviate in a range between $-0.03$ and $+0.05$ times the respective individual focal length; permissible tolerances for the variable air spaces $d8$, $d14$ and $d16$ are $\pm 0.05 f_I$. The air spaces $d20$ and $d22$ flanking the prism P may deviate from the list of values by $\pm 0.1 f_I$. The range of tolerances of the refractive indices is $\pm 0.02$ and that of the Abbe numbers is $\pm 5$.

By the same token, the planar surface represented by radius $r20$ could be replaced by a concave or convex surface of large radius of curvature.

Finally, any compound lens included in the system may be split into its constituent lenses separated by a very small air gap.

I claim:

1. In an optical objective system including a fixed-focus rear lens group, the combination therewith of a forward lens group consisting of a substantially fixed positive first component, an axially movable negative second component, an axially movable negative third component and a fixed positive fourth component; said first component including three air-spaced collective lens members and a dispersive front lens preceding said collective lens members, said second component consisting of two air-spaced dispersive lens members; said second and third components being displaceable between two extreme positions in which the overall focal length of the system assumes respective values $f_{min}$ and $f_{max}$ defining the lower and upper limits of a varifocal range; said front lens and said three collective lens members being single lenses L1, L2, L3, L4; the dispersive lens members of said second component being a pair of doublets composed of lenses L5, L6 and L7, L8; said third component being a single lens L9; and said fourth component consisting of two air-spaced single lenses L10, L11; the numerical values of the radii $r1$ to $r20$ and of the thicknesses and separations $d1$ to $d19$ of said lenses L1 to L11, along with their refractive indices $n_e$ and their Abbe numbers $v_e$, being substantially as given in the following table:

| Radii | Thicknesses and Separations | $n_e$ | $v_e$ |
|---|---|---|---|
| $r1 = -120$ | $d1 = 2.0$ | 1.79 | 26 |
| $r2 = +166$ | $d2 = 2.3$ | air space | |
| $r3 = +214$ | $d3 = 8.1$ | 1.62 | 60 |
| $r4 = -93$ | $d4 = 0.01$ | air space | |
| $r5 = +90$ | $d5 = 6.8$ | 1.62 | 60 |
| | $d6 = 0.01$ | air space | |
| $r7 = +50$ | $d7 = 5.4$ | 1.68 | 55 |
| $r8 = +100$ | $d8 = 30$ | air space (variable) | |
| $r9 = +161$ | $d9 = 4.1$ | 1.76 | 27 |
| $r10 = -65$ | $d10 = 1.1$ | 1.68 | 55 |
| $r11 = +24$ | $d11 = 4.1$ | air space | |
| $r12 = -2.80$ | $d12 = 3.1$ | 1.76 | 27 |
| $r13 = -34$ | $d13 = 1.0$ | 1.68 | 55 |
| $r14 = +25$ | $d14 = 3.1$ | air space (variable) | |
| $r15 = -17$ | $d15 = 1.0$ | 1.49 | 70 |
| $r16 = -175$ | $r16 = 14$ | air space (variable) | |
| $r17 = +120$ | $d17 = 1.8$ | 1.53 | 51 |
| $r18 = -54$ | $d18 = 0.01$ | air space | |
| $r19 = +49$ | $d19 = 1.8$ | 1.53 | 51 |
| $r20 = \infty$ | | | |

2. In an optical objective system including a fixed-focus rear lens group, the combination therewith of a forward lens group consisting of a substantially fixed positive first component, an axially movable negative second component, an axially movable negative third component and a fixed positive fourth component; said first component including three air-spaced collective lens members and a dispersive front lens preceding said collective lens members; said second component consisting of two air-spaced dispersive lens members; said second and third components being displaceable between two extreme positions in which the overall focal length of the system assumes respective values $f_{min}$ and $f_{max}$ defining the lower and upper limits of a varifocal range; said rear lens group consisting of five air-spaced singlets including a positive first lens L13, a positive second lens L14, a negative third lens L15, a negative fourth lens L16 and a positive fifth lens L17; the numerical values of the radii $r23$ to $r32$ and of the thicknesses and separations $d23$ to $d31$ of said lenses L13 to L17, along with their refractive indices $n_e$ and their Abbe numbers $\nu_e$, being substantially as given in the following table:

| Radii | Thicknesses and Separations | $n_e$ | $\nu_e$ |
|---|---|---|---|
| $r23 = +21$ | $d23 = 2.9$ | 1.64 | 55 |
| $r24 = -132$ | $d24 = 0.01$ | air space | |
| $r25 = +13$ | $d25 = 2.4$ | 1.69 | 54 |
| $r26 = +47$ | $d26 = 1.4$ | air space | |
| $r27 = -77$ | $d27 = 1.0$ | 1.81 | 25 |
| $r28 = +21$ | $d28 = 2.3$ | air space | |
| $r29 = +78$ | $d29 = 1.0$ | 1.81 | 25 |
| $r30 = +10$ | $d30 = 2.0$ | air space | |
| $r31 = +21$ | $d31 = 2.5$ | 1.67 | 47 |
| $r32 = -15$ | | | |

* * * * *